(12) United States Patent
Dichtl et al.

(10) Patent No.: US 9,983,245 B2
(45) Date of Patent: May 29, 2018

(54) METHOD AND APPARATUS FOR RECOGNIZING A MANIPULATION ON AN ELECTRICAL LINE

(71) Applicants: Markus Dichtl, München (DE); Bernd Meyer, München (DE)

(72) Inventors: Markus Dichtl, München (DE); Bernd Meyer, München (DE)

(73) Assignee: Siemens Aktiengesellscahft, München (DE)

( * ) Notice: Subject to any disclaimer, the term of this patent is extended or adjusted under 35 U.S.C. 154(b) by 293 days.

(21) Appl. No.: 14/396,949

(22) PCT Filed: Mar. 14, 2013

(86) PCT No.: PCT/EP2013/055257
§ 371 (c)(1),
(2) Date: Oct. 24, 2014

(87) PCT Pub. No.: WO2013/160009
PCT Pub. Date: Oct. 31, 2013

(65) Prior Publication Data
US 2015/0109002 A1    Apr. 23, 2015

(30) Foreign Application Priority Data
Apr. 25, 2012 (DE) .................. 10 2012 206 870

(51) Int. Cl.
*G01R 31/08* (2006.01)
*G01R 27/26* (2006.01)
(Continued)

(52) U.S. Cl.
CPC ...... *G01R 27/2605* (2013.01); *G01R 27/2611* (2013.01); *G06F 21/85* (2013.01);
(Continued)

(58) Field of Classification Search
CPC .... G01R 27/16; G01R 27/04; G01R 27/2605; G01R 27/2611; G01R 31/002; G01R 31/08; H04B 15/005; H04B 2203/5425
(Continued)

(56) References Cited

U.S. PATENT DOCUMENTS

| 4,429,299 A | * | 1/1984 | Kabat | .................... G08B 19/00 340/10.1 |
| 5,550,530 A | | 8/1996 | Hamm | |

(Continued)

FOREIGN PATENT DOCUMENTS

| BE | 1013259 A6 | 11/2001 |
| CN | 1283893 A | 2/2001 |

(Continued)

OTHER PUBLICATIONS

German Office Action for German Application No. 10 2012 206 870.8, dated Jan. 15, 2013, with English Translation.
(Continued)

*Primary Examiner* — Alesa Allgood
(74) *Attorney, Agent, or Firm* — Lempia Summerfield Katz LLC

(57) ABSTRACT

A method for recognizing a manipulation of at least one electrical line includes determining a parameter that is dependent on a resistance and a capacity, a resistance and an inductivity, or a resistance, a capacity, and an inductivity of the electrical line; comparing the determined parameter to a reference parameter to provide a comparison result; and recognizing a manipulation of the electrical line based on the provided comparison result.

19 Claims, 7 Drawing Sheets

(51) Int. Cl.
*G08B 29/08* (2006.01)
*G08B 29/24* (2006.01)
*G06F 21/85* (2013.01)
*G06F 21/86* (2013.01)

(52) U.S. Cl.
CPC ............ *G06F 21/86* (2013.01); *G08B 29/08* (2013.01); *G08B 29/24* (2013.01)

(58) Field of Classification Search
USPC .............. 324/652, 691, 686, 600, 656, 679; 333/12; 307/3
See application file for complete search history.

(56) References Cited

U.S. PATENT DOCUMENTS

| | | | |
|---|---|---|---|
| 6,246,734 B1 * | 6/2001 | Ohuchi | H03F 3/62 307/10.1 |
| 2006/0061368 A1 | 3/2006 | Furse et al. | |
| 2008/0186172 A1 * | 8/2008 | Thompson | H05C 3/00 340/541 |
| 2010/0204946 A1 * | 8/2010 | Warren | G01R 31/40 702/108 |
| 2013/0181698 A1 * | 7/2013 | Rutheiser | G01R 31/40 324/103 R |

FOREIGN PATENT DOCUMENTS

| | | | | |
|---|---|---|---|---|
| CN | 1855710 A | 11/2006 | | |
| CN | 201467084 U | 5/2010 | | |
| FR | 2413729 | * | 7/1979 | ......... B60R 25/1004 |
| FR | 2413729 A1 | 7/1979 | | |
| WO | WO2008095160 A1 | 8/2008 | | |

OTHER PUBLICATIONS

PCT International Search Report and Written Opinion of the International Searching Authority dated Aug. 20, 2013 for corresponding PCT/EP2013/055257.

Chinese Office action for related Chinese Application No. 201380021688.5, dated Sep. 21, 2015, with English Translation.

* cited by examiner

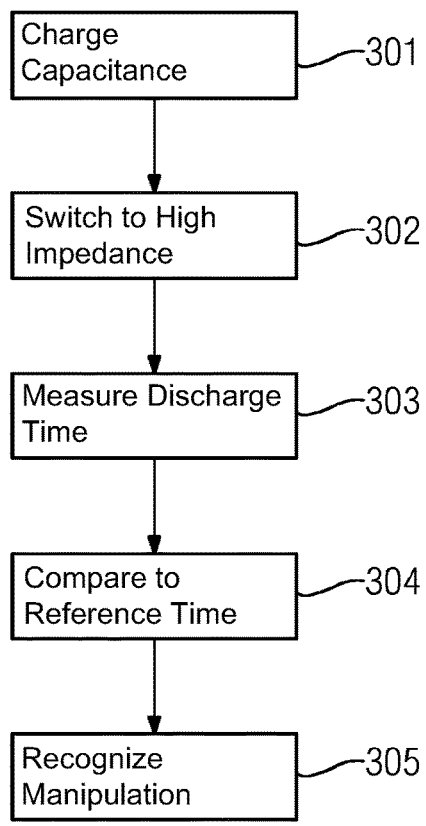
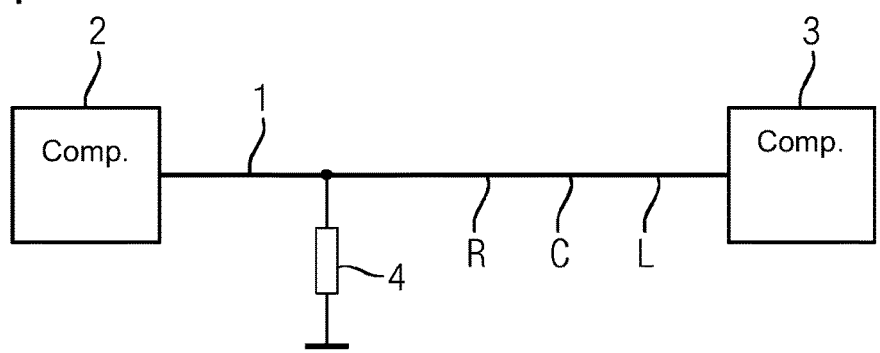

METHOD AND APPARATUS FOR RECOGNIZING A MANIPULATION ON AN ELECTRICAL LINE

RELATED APPLICATIONS

This application is the National Stage of International Application No. PCT/EP2013/055257, filed Mar. 14, 2013, which claims the benefit of German Patent Application No. DE 102012206870.8, filed Apr. 25, 2012. The entire contents of both documents are hereby incorporated herein by reference.

TECHNICAL FIELD

The present teachings relate generally to a method and an apparatus for recognizing a manipulation on an electrical line. The electrical line may be, for example, a communication line, a communication bus, a data or address line, a supply line, a line that is selectively used for supply and communication, a line on a printed circuit board between electronic components (e.g., integrated circuits) or a line that is connected only on one side (e.g., floating gate).

BACKGROUND

There are various methods for recognizing manipulation attempts on electrical lines and on electronic circuits. The different methods may be divided into methods with and without sensor technology and into active and passive methods.

For example, in the simplest form, seals, lead seals or especially manufactured housings may be used in electricity meters. The methods may be used to verify the integrity by a check process. The check method may range from a simple visual inspection to elaborate laboratory tests. The equipment to be protected may not be able to perform the check automatically. Thus, in order for the methods to offer protection, the manufacturer may need a technological advantage over a potential attacker or forger.

Many electronic systems monitor their operating parameters in order to guarantee their correct functioning. Examples include monitoring temperature, operating voltage or frequency. Furthermore, error-detecting and error-correcting codes for protecting saved data, redundantly designed system components, watchdogs, and the like may be used. However, these technologies may protect only against accidentally occurring errors and, therefore, may be relevant to security-critical applications.

Deliberate changes to data and programs may also be recognized by cryptographic methods. In order for an electronic system to reliably perform the check and react appropriately to recognized manipulations, a protected program execution (e.g., at least of the check routines) may be used. Otherwise, the attacker may prevent a check method from being performed or the check result from being evaluated again by manipulating the hardware. For such hardware manipulations, special chips (e.g., modchips) may be developed and sold. For the attack, individual lines of a board are interrupted and the modchip is planted in the signal paths. The modchip does not disturb the normal functioning of the equipment. The modchip only engages with the program execution at specific points and changes values on the data bus in a targeted manner in order, for example, to manipulate a security check.

Special security controllers (e.g., hardware security tokens, such as chip cards or microcontrollers with an integrated RAM memory and a non-volatile memory) may be used in practical applications to provide a protected program execution. The secret key material may be permanently stored on the tokens, and at least parts of the application that are relevant to security (e.g., cryptographic routines) are executed on the controllers. This approach uses no sensor technology with active components and is reliant on the special protection measures of the controllers that are implemented in hardware.

Rarely, an entire computer system may be protected by active sensor technology in order to provide secure program execution. The range extends from simple housing switches (e.g., to recognize unauthorized opening) up to special packaging and encapsulation molds (e.g., anti-drilling protective film and specially manufactured printed circuit boards). The electronics continuously monitor the electrical properties of the packaged computer system and, in the case of manipulations, trigger an alarm whereby key material and/or the program may be erased.

Protective measures as described above may entail high manufacturing costs and use a battery for an uninterruptible power supply to the protective electronics. As a result, additional costs and problems relating to service life, operating parameters, and methods of battery replacement may arise. The sensor technology used for monitoring may be implemented in various ways. Examples include nonreactive measurement bridges, light and pressure sensors, and capacitive and inductive sensors.

SUMMARY AND DESCRIPTION

The scope of the present invention is defined solely by the appended claims, and is not affected to any degree by the statements within this summary.

The present embodiments may obviate one or more of the drawbacks or limitations in the related art. For example, in some embodiments, a simple and inexpensive technique for detecting a manipulation on an electrical line is provided.

A method for recognizing a manipulation of at least one electrical line is provided. The electrical line has a specific resistance, a specific capacitance, and a specific inductance. In addition, the electrical line couples at least two components. In a first act, a defined parameter is determined. The defined parameter is dependent on the resistance and the capacitance, on the resistance and the inductance, or on the resistance and the capacitance and the inductance of the electrical line. In a second act, the determined parameter is compared with a reference parameter to provide a comparison result. In a third act, a manipulation of the electrical line is recognized on the basis of the provided comparison result.

It may be determined from the comparison result whether the electrical line was manipulated. Examples of a manipulation of this type include the attaching of a cable to the electrical line or the attaching of a measuring device to the electrical line.

The electrical line may be, for example, a bus or a bus system that couples or connects a plurality of communication subscribers. The electrical line may also be a bidirectional bus. The communication subscribers may include a bus master and various bus slaves, such as actuators and sensors.

The reference parameters may be stored in a memory or generated in a personalization act that is to be performed.

The above-described method facilitates automatic recognition of changes on the electrical line and also on the components or communication subscribers coupled to the electrical line. Hence, the electrical line and the components or communication subscribers coupled thereto may be protected through automatic recognition of whether the electrical line is being tapped or additional electronic components have been introduced (e.g., by the fitting of the above-described modchips). If a manipulation is detected, the intrusion may be reacted to in an active manner, if appropriate. For example, in reaction to a recognized attack on the electrical line, stored key materials or data to be protected may be immediately erased. Alternatively, the functioning of the electrical line or of the equipment may be changed. Furthermore, the electrical line or the equipment may also be switched off.

Hence, a simple and inexpensive mechanism is provided for monitoring the electrical line (e.g., an external line of a microcontroller). Conventional printed circuit boards and population techniques may be used since the electrical line to be protected may not need to be packaged. The electrical properties (e.g., the capacitance and/or the inductance and the resistance of the electrical line) may be measured repeatedly during the operation of the electrical lines. Thus, manipulation attempts by an attacker or changes to the circuit design may be recognized. Bidirectional buses (e.g., data buses from external components, such as memories or peripheral units) may thus be protected.

As described above, the electrical line may be a communication bus or bus that couples a bus master to a number of bus slaves. For bidirectionally used buses, all connected communication subscribers or components have a so-called enable signal that allows the bus master to address the individual communication subscribers in a targeted manner for communication therewith. The communication subscribers that are not taking part in the communication receive a disable signal and switch their output driver for the bus to high impedance in order not to cause a short circuit on the bus. To achieve the switch to high impedance, the drivers of the output signals may be, for example, tristate-capable. In other words, the drivers of the output signals may also be switched to high impedance as a third state in addition to the starting states logic 0 and logic 1. If all connected communication subscribers of the bus are simultaneously set to the high-impedance state, then each individual line of the bus behaves like a chain of parallel-connected RC members containing the low resistance-per-unit-length and capacitance-per-unit-length of the connection pads of the integrated circuits (ICs), the contact and the line on the printed circuit board, and respective high-terminating resistances of the connected components.

The electrical properties of the bus lines to be monitored (e.g., the resistance and the capacitance) may be measured in the high-impedance state in order to detect manipulation attempts that also change the electrical response behavior of the lines. As a result, an inexpensive solution is provided that may be used universally in field-programmable gate arrays (FPGAs) and application-specific integrated circuits (ASICs).

In some embodiments, the parameter that is determined is a duration that is dependent on the resistance and the capacitance of the electrical line.

In some embodiments, the time behavior of the at least one electrical line (e.g., of bus lines) is measured. The product of the resistance R and the capacitance C ($\tau = R \cdot C$) may be determined from high-terminating resistances and the capacitance-per-unit-length of the electrical components of the electrical line. For example, in order to perform such a measurement, the bus master may drive a logic 1 signal on the electrical line (e.g., the bidirectional bus) while all connected communication subscribers have a disable signal and, therefore, are high-impedance. As a result, the capacitor of the bus line formed by the conductor track of the printed circuit board is electrically charged. Subsequently, the bus master likewise switches its output driver to high-impedance and uses the signal on the line of the bus as input signal. The RC members of the bus line may discharge themselves via the high-impedance terminating resistors of the connected components and by leakage currents until the signal represented by the voltage at the input of the bus master changes from logic 1 to logic 0. The duration until the change in signal is characteristic of the electrical properties of each individual electrical line and depends on the geometry of the electrical line and on all connected components. Time measurements may be readily performed using high, stable internal clocks. Each change in the circuit and each attempt to tap the signal of the bus line will significantly change, for example, the resistive and capacitive properties of the bus line and, therefore, the duration until a change in the logic signals. As a result, manipulations may be unambiguously determined.

If the CPU of the bus master is clocked at a sufficiently high rate, the CPU may count the clock signals from the instant a bus line is switched to high impedance until the logic change of the value by a simple loop. In this way, the discharging time may be measured. Alternatively, a rapidly running counter for the time measurement may also be realized with few electronic components.

The CPU repeatedly measures the time behavior of its bidirectional buses of all the electrical lines to be monitored in a manner described above and checks for significant deviations from expected behavior. The deviation is determined using the comparison result. If a significant deviation is determined, an attack is thus detected and the CPU of the bus master may take suitable countermeasures.

Depending on the application, only one small external additional wiring (e.g., through a pull-down resistor or a pull-up resistor) may be used, if appropriate. The components used for the time measurement in the bus master may be, for example, a tristate buffer that is present to control a bidirectional bus, and, optionally, a rapidly running counter for the time measurement. All electronic components may be made with standard cell libraries.

Furthermore, unidirectional signal lines as electrical lines may be extended by an additional tristate driver and the corresponding input-output components (I-O components). The present method may be applied to additional connection lines of a microcontroller or an integrated circuit.

In some embodiments, the method includes the following acts: (a) measuring the present ambient temperature of the electrical line; (b) changing the determined parameter and/or the reference parameter by a temperature compensation on the basis of the measured present ambient temperature; (c) comparing the parameter with the reference parameter to provide the comparison result; and (d) recognizing a manipulation of the electrical line on the basis of the provided comparison result.

Since semiconductors and the resistors to be measured may have a characteristic temperature profile, the respective actual temperature may be measured and a suitable temperature compensation may be realized in order to reduce the number and the probability of false alarms. Temperature compensation may be implemented in hardware and/or in software (e.g., in the monitoring routine of the CPU of the bus master).

In some embodiments, the currently determined defined parameter of the electrical line is used for temperature compensation of at least one additional electrical line.

In some embodiments, the method includes the following acts: (a) determining at least one item of state information of the electrical line; (b) changing the determined parameter and/or the reference parameter by a state compensation on the basis of the determined at least one item of state information; (c) comparing the parameter with the reference parameter to provide the comparison result; and (d) recognizing a manipulation of the electrical line on the basis of the provided comparison result.

The item of state information may include operating parameters, age, and drift.

The above-described state compensation may take into account the aging of the electronic components. Additionally, a slow drift that may arise, for example, as a result of a change in the operating parameters or aging of the electronic components may be compensated for in order to reliably avoid false alarms. For this purpose, items of state information relating to the system to be measured may stored in a non-volatile memory and updated at regular intervals.

In some embodiments, the determined at least one item of state information of the electrical line is used for the state compensation of at least one additional electrical line.

Thus, a differential analysis is also provided. The circumstance of the changing ambient conditions and operating parameters may also be solved by the above-described differential analysis. For example, on one hand, changes in the operating parameters and the aging of the electronic components may have a simultaneous and uniform effect owing to the narrowly delimited locality of the electrical lines and the connected components within a piece of equipment. On the other hand, an attacker may not be able to sufficiently manipulate all measured points at the same time and to the same extent in order to counteract the detection of a manipulation.

In some embodiments, the method includes the following acts: (a) charging the capacitance of the electrical line; (b) switching all of the components coupled to the electrical line to high impedance; (c) measuring a defined discharging time during a discharging of the capacitance of the electrical line; (d) comparing the measured discharging time with a reference discharging time to provide a comparison result; and (e) recognizing a manipulation of the electrical line on the basis of the provided comparison result.

In some embodiments, the capacitance of the electrical line is discharged by a pull-down resistor.

The pull-down resistor may be used, for example, if one of the connected components prevents the discharging of the electrical line (e.g., even in the high-impedance state) or to set the time behavior. The actual value of the pull-down resistor and the manufacturing tolerance thereof may be used to vary the time behavior during discharging of the bus line.

In some embodiments, the method includes the following acts: (a) discharging the capacitance of the electrical line; (b) switching all of the components coupled to the electrical line to high impedance; (c) charging the capacitance of the electrical line by a pull-up resistor; (d) measuring a defined charging time during the charging of the capacitance of the electrical line; (e) comparing the measured charging time with a reference charging time to provide a comparison result; and (f) recognizing a manipulation of the electrical line on the basis of the provided comparison result.

In some embodiments, at the beginning of measurement, the bus master may drive the value logic 0 on the electrical line (e.g., a bidirectional bus) in order to discharge the electrical line. Once the bus master has switched its driver to high impedance, the bus line is charged via the pull-up resistor until the present voltage signals a change to logic 1. The duration from a change from logic 0 to logic 1 is measured. The measured duration is then compared with the reference charging time in order to provide the comparison result.

In some embodiments, all of the components coupled to the electrical line are switched to high impedance by at least one tristate driver.

In some embodiments, a frequency of an oscillator is determined as the parameter. The frequency is dependent on the resistance and the capacitance and/or the inductance of the electrical line.

In some embodiments, the electrical line is configured as a communication bus.

A computer program product is provided that causes a method as described above to be performed on a program-controlled device.

A computer program product may be provided or supplied, for example, as a storage medium, such as a memory card, USB stick, CD-ROM, DVD or else in the form of a downloadable file from a server in a network. Downloading may take place, for example, in a wireless communication network by the transfer of a corresponding file with the computer program product.

An apparatus for recognizing a manipulation of at least one electrical line is provided. The electrical line has a resistance, a capacitance and an inductance, and couples at least two components. The apparatus has a determination part, a comparison part, and a recognition part. The determination part is configured for determining a parameter that is dependent on the resistance and the capacitance, on the resistance and the inductance, or on the resistance, the capacitance, and the inductance of the electrical line. The comparison part is configured for comparing the determined parameter with a reference parameter to provide a comparison result. The recognition part is configured for recognizing a manipulation of the electrical line on the basis of the provided comparison result.

The respective parts (e.g., determination part, comparison part, and recognition part) may be implemented in hardware and/or software. For implementation in hardware, the respective parts may be configured as an apparatus or a part of an apparatus (e.g., a computer or microprocessor). For implementation in software, the respective parts may be configured as a computer program product, a function, a routine, a part of a program code, or an executable object.

In addition, a system is provided that includes an electrical line that has a resistance, a capacitance, and a inductance; at least two components that are coupled via the electrical line; and an apparatus as described above configured for recognizing a manipulation on the electrical line.

BRIEF DESCRIPTION OF THE DRAWINGS

FIG. 3 shows a flow chart of a second example of a method for recognizing a manipulation on an electrical line.

FIG. 4 shows a block circuit diagram of a second example of an electrical line with two coupled components.

DETAILED DESCRIPTION

Figure 1:
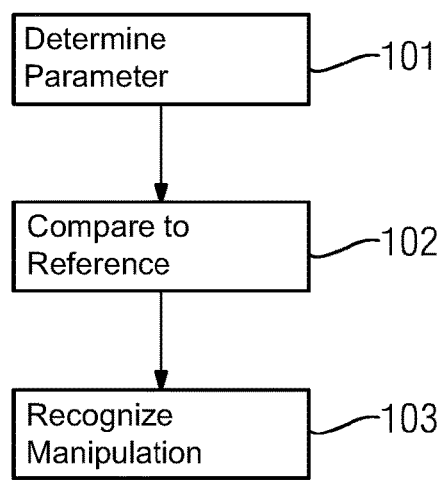
FIG. 1 shows a flow chart of a first example of a method for recognizing a manipulation on an electrical line.

In the drawing figures, identical or functionally identical elements have been provided with the same reference signs unless stated otherwise.

Figure 2:
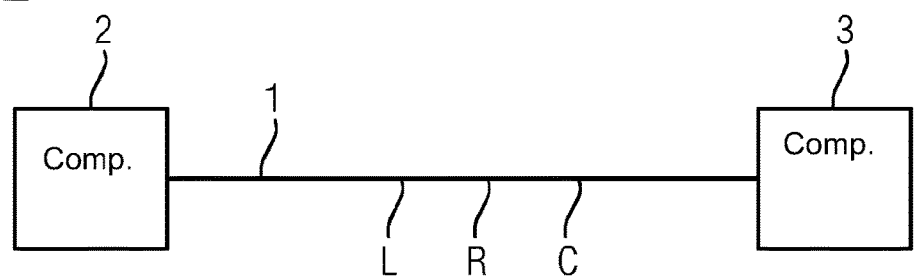
FIG. 2 shows a block circuit diagram of a first example of an electrical line with two coupled components.

FIG. 1 illustrates a flow chart of a first example of a method for recognizing a manipulation on an electrical line 1. FIG. 2 shows a block circuit diagram of the electrical line 1 with a first coupled component 2 and a second coupled component 3. As used herein, the terms component and communication subscriber are used synonymously. The electrical line 1 is, for example, an electrical line. The electrical line 1 has a specific resistance R, a specific inductance L, and a specific capacitance C.

In act 101, a defined parameter that is dependent on the resistance R and the capacitance C and/or the inductance L of the electrical line 1 is determined. In act 102, the determined parameter is compared with a reference parameter to provide a comparison result. In act 103, a manipulation of the electrical line 1 is recognized on the basis of the provided comparison result.

FIG. 3 illustrates a flow chart of a second example of a method for recognizing a manipulation on an electrical line 1. FIG. 4 shows an electrical line 1 that couples the first communication subscriber 2 and the second communication subscriber 3. The electrical line 1 has a resistance R and a capacitance C. The electrical line 1 in FIG. 4 is coupled to a pull-down resistor 4.

In act 301, the capacitance C of the electrical line 1 is charged. In act 302, all of the communication subscribers coupled to the electrical line 1 are switched to high impedance. In the example in FIG. 4, these communication subscribers are the first communication subscriber 2 and the second communication subscriber 3.

In act 303, a defined discharging time is measured during a discharging of the capacitance of the electrical line. The defined discharging time τ may correspond to the product of the resistance R and the capacitance C (τ=R·C). The capacitance C of the electrical line 1 may be discharged by the pull-down resistor 4.

In act 304, the measured discharging time is compared with a reference discharging time and a comparison result is provided as a result of the comparison. In act 305, a manipulation on the electrical line 1 is recognized on the basis of the provided comparison result. In other words, a determination as to whether or not the electrical line has been manipulated may be derived from the comparison result. An example of such a manipulation is the attaching of an additional line.

Figure 5:
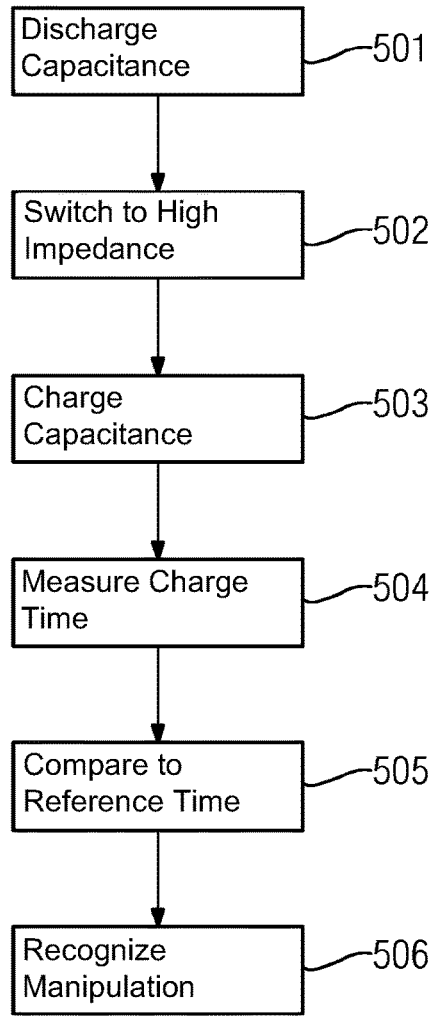
FIG. 5 shows a flow chart of a third example of a method for recognizing a manipulation on an electrical line.
Figure 6:
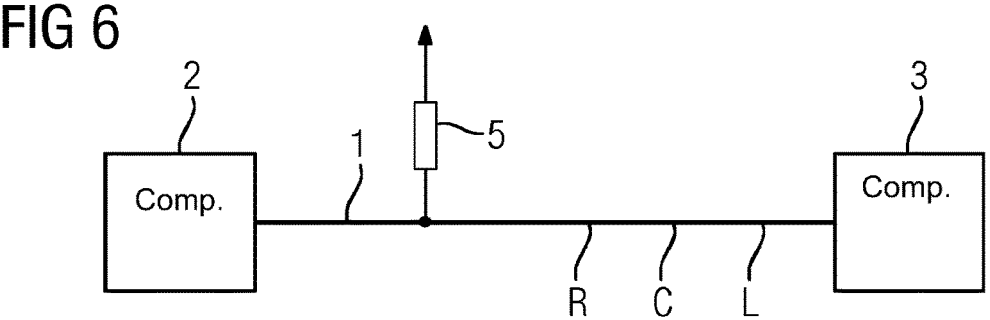
FIG. 6 shows a block circuit diagram of a third example of an electrical line with two coupled components.

FIG. 5 illustrates a flow chart of a third example of a method for recognizing a manipulation on an electrical line 1. FIG. 6 shows a communication initiation 2 with two coupled communication subscribers (e.g., the first communication subscriber 2 and the second communication subscriber 3) and a pull-up resistor 5.

In act 501, the capacitance C of the electrical line 1 is discharged. In act 502, the first communication subscriber 2 and the second communication subscriber 3 coupled to the electrical line 1 are switched to high impedance. The first communication subscriber 2 and the second communication subscriber 3 coupled to the electrical line 1 are switched to high impedance by a tristate driver 6 (cf., FIG. 8).

In act 503, the capacitance C of the electrical line 1 is charged by the pull-up resistor 5. In act 504, a defined charging time is measured during the charging of the capacitance C of the electrical line. In act 505, the measured charging time is compared with a reference charging time to provide a comparison result. In act 506, a manipulation of the electrical line 1 is recognized or detected on the basis of the provided comparison result.

Figure 7:
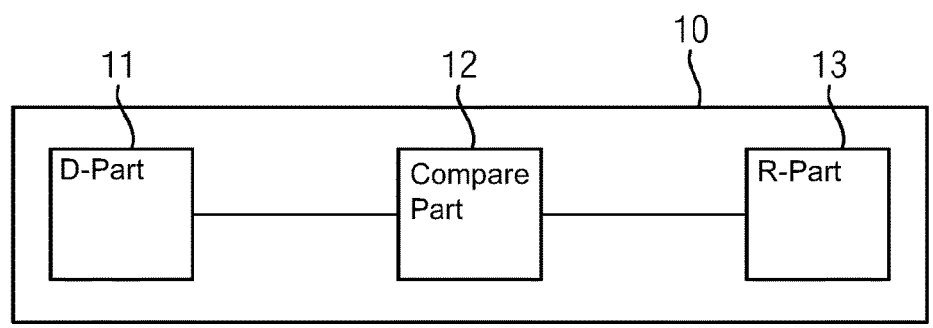
FIG. 7 shows a block circuit diagram of an example of an apparatus for recognizing a manipulation on an electrical line.

FIG. 7 shows an apparatus 10 for recognizing a manipulation of an electrical line 1 that couples at least two communication subscribers (e.g., the first communication subscriber 2 and the second communication subscriber 3) and that has a resistance R and a capacitance C.

The apparatus 10 has a determination part 11, a comparison part 12, and a recognition part 13. The determination part 11 is configured for determining a parameter that is dependent on the resistance R and the capacitance C and/or the inductance L of the electrical line 1. The comparison part 12 is configured to compare the determined parameter with a reference parameter to provide a comparison result. The recognition part 13 is configured to recognize a manipulation of the electrical line 1 on the basis of the provided comparison result.

Figure 8:
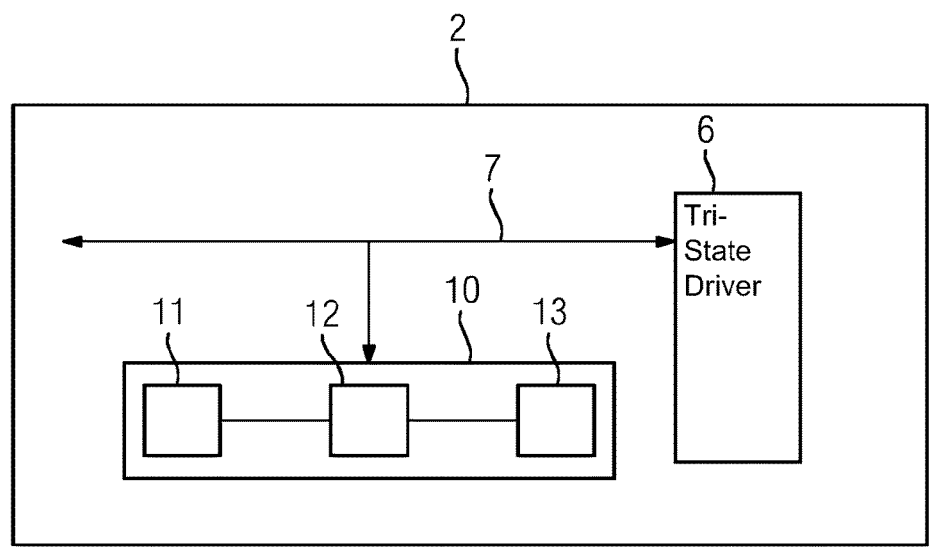
FIG. 8 shows a block circuit diagram of an example of a component.

Furthermore, FIG. 8 shows a block circuit diagram of an example of a component 2 as shown in FIG. 2. The component 2 may be a bus master and may include the apparatus 10 from FIG. 7 and a tristate driver 6. The apparatus 10 and the tristate driver 6 are coupled via a data bus 7.

The results of some practical experiments are described below. The measurement set-up includes a Spartan 3 FPGA board from Xilinx. A connection pad of the FPGA is connected to ground via a 1 Mohm resistor. The pad was periodically set to the value 1. As a result, the RC member resulting from the pad and the external wiring was charged to the operating voltage of the FPGA of 3.3 V and subsequently switched to high impedance. A 32-bit counter operated with the system clock of 66 MHz is used to measure the duration until the connection pad shows the value 0 again.

Four experiments were conducted with the measurement set-up. The results of these experiments may be seen in FIGS. 9 to 13. In each experiment, 10 000 measured samples were plotted. FIGS. 9 to 12 show the distribution of frequencies of the measured counter readings in the case of four different experiments.

Figure 9:
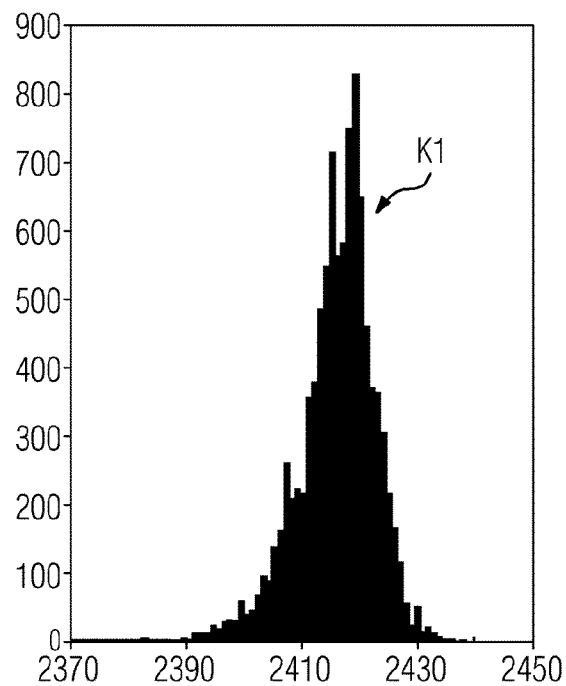
FIG. 9 shows an exemplary distribution of frequencies of measured counter readings in a first experiment

FIG. 9 shows a first experiment in which the above-described set-up was used without further wiring.

Figure 10:
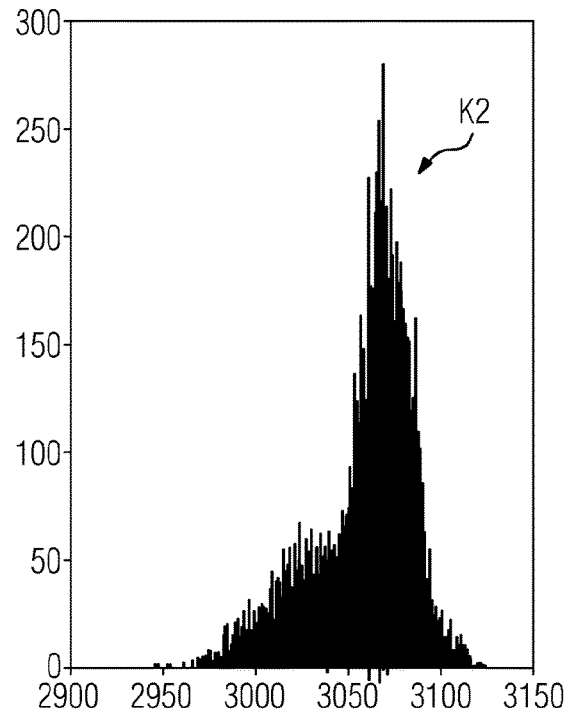
FIG. 10 shows an exemplary distribution of frequencies of measured counter readings in a second experiment.

FIG. 10 shows a second experiment in which one side of an additional cable of approximately 70 cm in length has been connected to the connection pad of the FPGA. The effects that result from the additional capacitive load of the cable in comparison with the first experiment are clearly recognizable from a comparison of the curve K2 in FIG. 10 with the curve K1 in FIG. 9.

Figure 11:
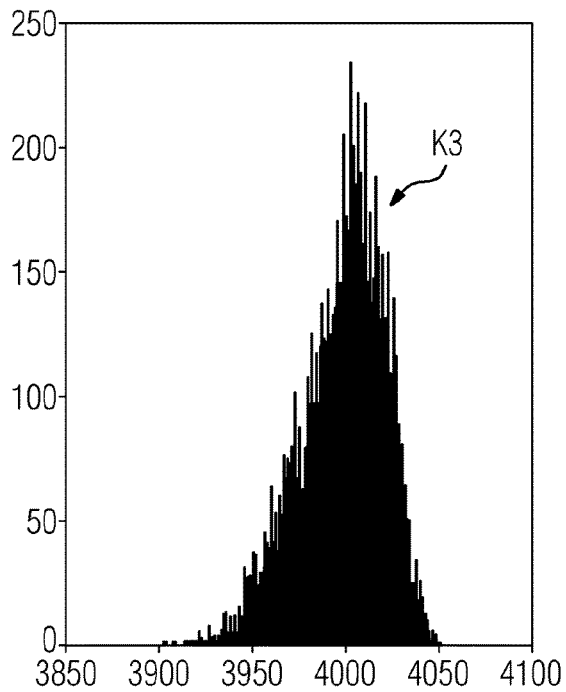
FIG. 11 shows an exemplary distribution of frequencies of measured counter readings in a third experiment.

FIG. 11 illustrates a third experiment in which a digital voltmeter is connected between the connection pad and ground of the FPGA board. The voltmeter was switched off.

Figure 12:
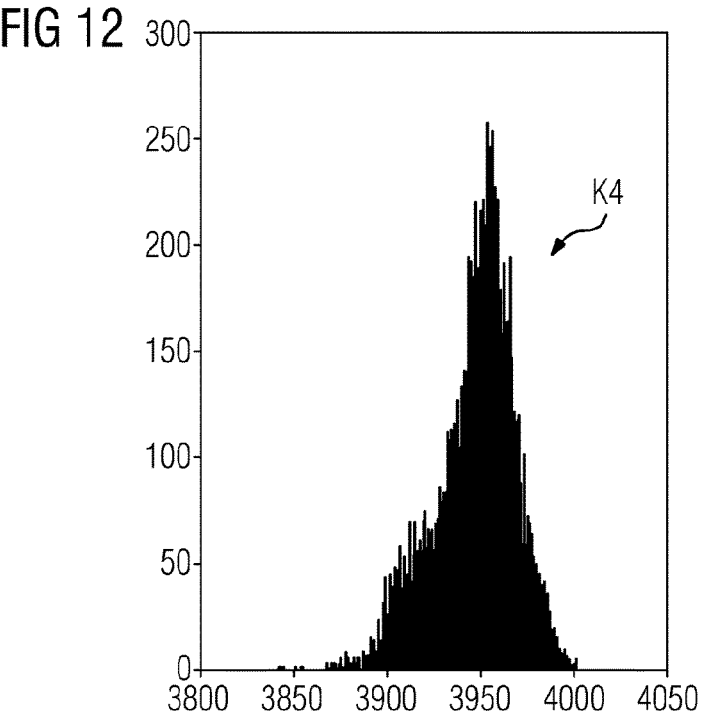
FIG. 12 shows an exemplary distribution of frequencies of measured counter readings in a fourth experiment.

FIG. 12 shows a fourth experiment in which the digital voltmeter is connected between the connection pad and ground of the FPGA board. The voltmeter was switched on.

Figure 13:
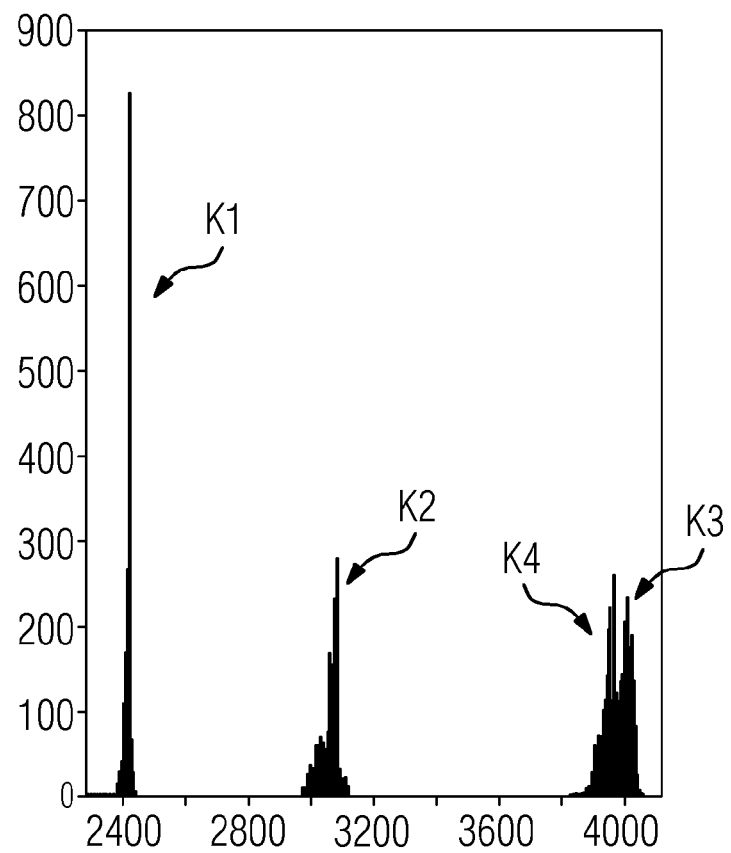
FIG. 13 shows an exemplary graph with the curves of FIGS. 9 to 12.

FIG. 13 shows the curves K1 to K4 of all four experiments for comparison. The manner of change in the average value of the measured distributions from experiment to experiment is clearly recognizable.

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding claim—whether independent or dependent—and that such new combinations are to be understood as forming a part of the present specification.

The invention claimed is:

1. A method for recognizing a manipulation of at least one electrical line of a bus, the at least one electrical line being a communications bus configured to couple at least two components, the at least two components comprising a bus master and a bus slave, and the at least one electrical line having a resistance, a capacitance, and an inductance, the method comprising:
   determining, by the bus master or the bus slave using a count or frequency from a counter or oscillator, a parameter that is dependent on the resistance and the capacitance, on the resistance and the inductance, or on the resistance, the capacitance, and the inductance of the electrical line connected between the bus master and bus slave;
   comparing, by the bus master or the bus slave, the determined parameter with a reference parameter stored in a memory to provide a comparison result;
   recognizing, by the bus master or the bus slave, a manipulation of the electrical line based on the provided comparison result; and
   protecting signal on the electrical line in response to recognizing the manipulation, the protecting comprising turning off the electrical line, the bus master, or the bus slave, comprising changing operation of the bus master or the bus slave, or comprising erasing saved data.

2. The method as claimed in claim 1, further comprising:
   discharging the capacitance of the electrical line;
   switching each of the at least two components coupled to the electrical line to high impedance;
   charging the capacitance of the electrical line by a pull-up resistor;
   measuring a defined charging time during the charging of the capacitance; and
   comparing the measured charging time with a reference charging time to provide the comparison result.

3. The method as claimed in claim 1, wherein the parameter comprises the frequency of the oscillator, wherein the frequency is dependent on the resistance and the capacitance, on the resistance and the inductance, or on the resistance, the capacitance, and the inductance.

4. The method as claimed in claim 1, wherein a duration that is dependent on the resistance and the capacitance of the electrical line is determined as the parameter.

5. The method as claimed in claim 4, further comprising:
   measuring a present ambient temperature of the electrical line; and
   changing the determined parameter, the reference parameter, or the determined parameter and the reference parameter by a temperature compensation based on the measured present ambient temperature.

6. The method as claimed in claim 4, further comprising:
   determining at least one item of state information of the electrical line; and
   changing the determined parameter, the reference parameter, or the determined parameter and the reference parameter by a state compensation based on the determined at least one item of state information.

7. The method as claimed in claim 4, further comprising:
   charging the capacitance of the electrical line;
   switching each of the at least two components coupled to the electrical line to high impedance;
   measuring a discharging time during a discharging of the capacitance; and
   comparing the measured discharging time with a reference discharging time to provide the comparison result.

8. The method as claimed in claim 1 further comprising:
   measuring a present ambient temperature of the electrical line; and
   changing the determined parameter, the reference parameter, or the determined parameter and the reference parameter by a temperature compensation based on the measured present ambient temperature.

9. The method as claimed in claim 8, further comprising:
   charging the capacitance of the electrical line;
   switching each of the at least two components coupled to the electrical line to high impedance;
   measuring a discharging time during a discharging of the capacitance; and
   comparing the measured discharging time with a reference discharging time to provide the comparison result.

10. The method as claimed in claim 8, wherein a currently determined parameter of the electrical line is used for the temperature compensation of at least one additional electrical line.

11. The method as claimed in claim 10, further comprising:
    charging the capacitance of the electrical line;
    switching each of the at least two components coupled to the electrical line to high impedance;
    measuring a discharging time during a discharging of the capacitance; and
    comparing the measured discharging time with a reference discharging time to provide the comparison result.

12. The method as claimed in claim 1 further comprising:
    determining at least one item of state information of the electrical line; and
    changing the determined parameter, the reference parameter, or the determined parameter and the reference parameter by a state compensation based on the determined at least one item of state information.

13. The method as claimed in claim 12, wherein the determined at least one item of state information of the electrical line is used for the state compensation of at least one additional electrical line.

14. The method as claimed in claim 1, further comprising:
    charging the capacitance of the electrical line;

switching each of the at least two components coupled to the electrical line to high impedance;

measuring a discharging time during a discharging of the capacitance; and comparing the measured discharging time with a reference discharging time to provide the comparison result.

15. The method as claimed in claim 14, wherein the capacitance of the electrical line is discharged by a pull-down resistor.

16. The method as claimed in claim 14, wherein each of the at least two components coupled to the electrical line is switched to high impedance by at least one tristate driver.

17. A non-transitory computer-readable storage medium having stored therein data representing instructions executable by a programmed processor for recognizing a manipulation of at least one electrical line of a communications bus, the at least one electrical line being configured to couple at least two components including a bus master and a bus slave and the at least one electrical line having a resistance, a capacitance, and an inductance, the storage medium comprising instructions for:

determining, based on a frequency or count, a parameter that is dependent on the resistance and the capacitance, on the resistance and the inductance, or on the resistance, the capacitance, and the inductance of the electrical line of the bus connected between the bus master and bus slave;

comparing the determined parameter with a reference parameter stored in memory to provide a comparison result;

recognizing a manipulation of the electrical line based on the provided comparison result; and protecting data on the electrical line in response to recognizing the manipulation, the protecting comprising turning off the electrical line, the bus master, or the bus slave, comprising changing operation of the bus master or the bus slave, or comprising erasing saved data.

18. An apparatus for recognizing a manipulation, the apparatus comprising: a first integrated circuit; a second integrated circuit; at least one electrical line configured to communicatively couple the first and second integrated circuits and the at least one electrical line having a resistance, a capacitance, and an inductance; and a microprocessor configured to: determine, based on a frequency or count from a counter or oscillator and dependent on the electrical line, a parameter that is dependent on the resistance and the capacitance, on the resistance and the inductance, or on the-resistance, the capacitance, and the inductance of the at least one electrical line; compare the determined parameter with a reference parameter stored in a memory to provide a comparison result; and recognize a manipulation of the electrical line based on the provided comparison result, wherein the microprocessor is configured to protect signal on the electrical line in response to recognition of the manipulation, the protection comprising turning off the electrical line, the bus master, or the bus slave, comprising change of operation of the bus master or the bus slave, or comprising erasure of saved data.

19. A system comprising: a communications bus with an electrical line having a resistance, a capacitance, and an inductance; at least two electronic components coupled via the electrical line of the bus, the electrical line of the bus configured to provide communication between the two electronic components, the at least two electronic components comprising at least two integrated circuits; and a computer configured to: determine, based on a frequency or count from a counter or oscillator and dependent on the electrical line, a parameter that is dependent on the resistance and the capacitance, on the resistance and the inductance, or on the resistance, the capacitance, and the inductance; compare the determined parameter with a reference parameter stored in a memory to provide a comparison result; and recognize a manipulation of the electrical line based on the provided comparison result, wherein the computer is configured to protect signal on the electrical line in response to recognition of the manipulation, the protection comprising turning off the electrical line, the bus master, or the bus slave, comprising change of operation of the bus master or the bus slave, or comprising erasure of saved data.

* * * * *

UNITED STATES PATENT AND TRADEMARK OFFICE
CERTIFICATE OF CORRECTION

PATENT NO. : 9,983,245 B2
APPLICATION NO. : 14/396949
DATED : May 29, 2018
INVENTOR(S) : Markus Dichtl et al.

Page 1 of 1

It is certified that error appears in the above-identified patent and that said Letters Patent is hereby corrected as shown below:

On the Title Page

Item [73], "Siemens Aktiengesellscahft" should be replaced with -- Siemens Aktiengesellschaft --

Signed and Sealed this
Tenth Day of July, 2018

Andrei Iancu
*Director of the United States Patent and Trademark Office*